Figure 1:
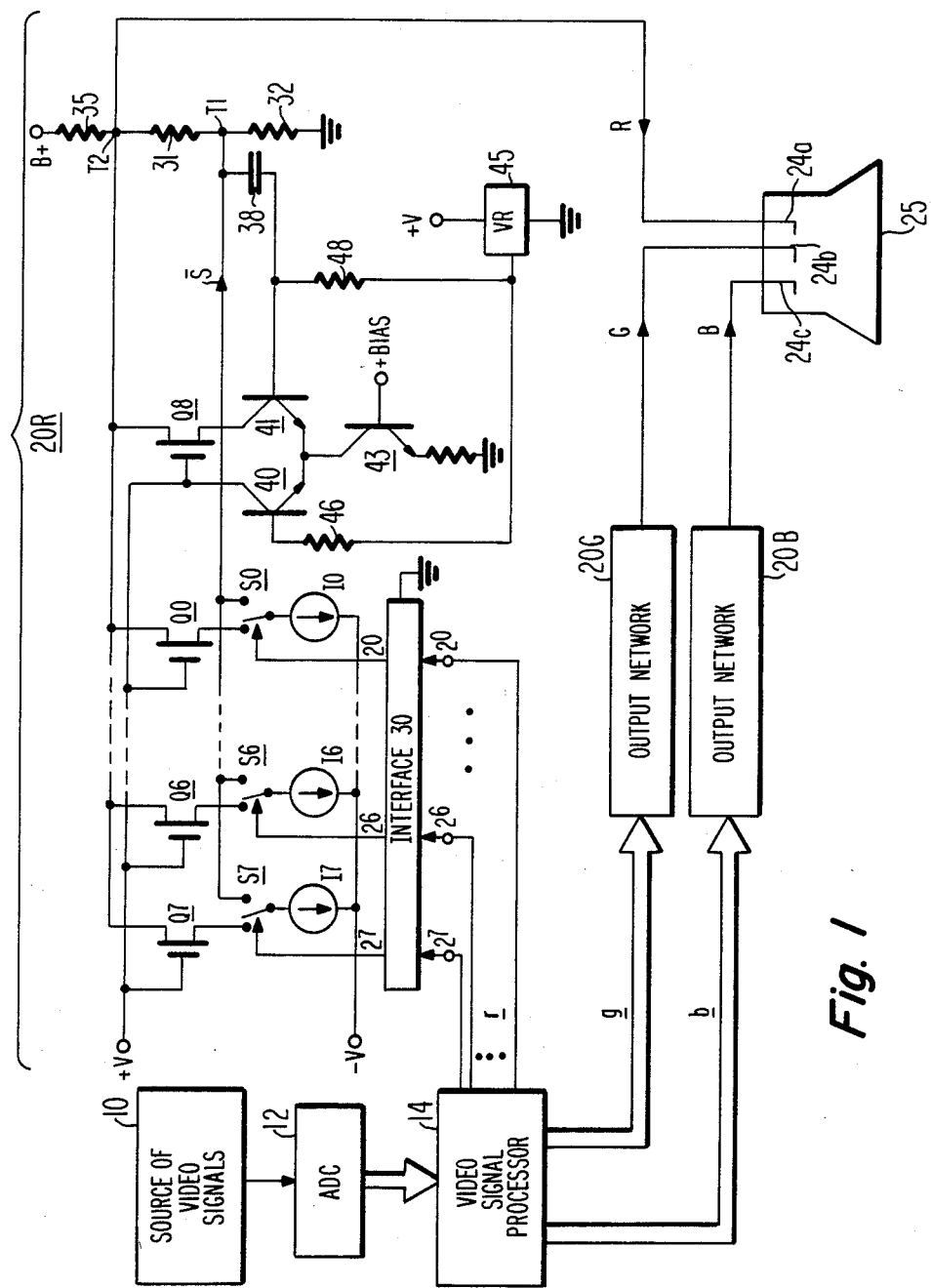

United States Patent [19]

Hinn

[11] Patent Number: 4,599,655
[45] Date of Patent: Jul. 8, 1986

[54] KINESCOPE DRIVER WITH HIGH FREQUENCY COMPENSATION

[75] Inventor: Werner Hinn, Zollikerberg, Switzerland

[73] Assignee: RCA Corporation, Princeton, N.J.

[21] Appl. No.: 544,453

[22] Filed: Aug. 27, 1984

[51] Int. Cl.⁴ .......................... H04N 5/68; H04N 9/535
[52] U.S. Cl. ......................................... 358/242; 358/65
[58] Field of Search ............... 358/242, 166, 167, 243, 358/64, 65

[56] References Cited

U.S. PATENT DOCUMENTS 4,118,731 10/1978 Hinn ....................................... 358/65
4,263,622 4/1981 Hinn ....................................... 358/242
4,450,476 5/1984 Tallant, II ............................ 358/243

OTHER PUBLICATIONS

Service Data bulletin for CTC-111 Color Television Receiver, 1983, p. 29, published by RCA Corporation, Indianapolis, Ind.

Primary Examiner—Tommy P. Chin
Attorney, Agent, or Firm—P. J. Rasmussen; P. M. Emanuel; R. H. Kurdyla

[57] ABSTRACT

In a video signal processing system including an image displaying kinescope and a kinescope driver stage, a version of signals processed by the driver stage and video output signals from the driver stage are combined to produce a resultant high frequency signal respresentative of high frequency components deficient in the video output signal. The resultant signal is applied to an input of the driver stage to compensate for the high frequency deficiency otherwise manifested by the video output signal.

14 Claims, 3 Drawing Figures

KINESCOPE DRIVER WITH HIGH FREQUENCY COMPENSATION

This invention concerns a video output amplifier for driving an image display device in a video signal processing system, and arranged to maintain a desired high frequency response. In particular, this invention concerns a high frequency compensated driver amplifier which is advantageously used in a system employing digital video signal processing techniques.

In a video signall processing system such as a television receiver or a video monitor for example, video signal information to be displayed is applied to intensity control electrodes of an image display device, such as a kinescope, from a high level output of a video output driver amplifier stage. The driver stage should exhibit a sufficiently wide bandwidth consistent with the bandwidth of video signals being processed. In particular, the driver stage should exhibit a sufficient high frequency response so that fine image detail information, as associated with the high frequency components of the video signal, is preserved in a displayed image.

One known technique for maintaining the high frequency response of a kinescope driver stage is to use a kinescope driver stage in a feedback configuration. Another known technique involves the use of one or more "peaking" coils included in output circuits of the driver stage to enhance, or peak, the response of the driver stage for high frequency signal components. It is herein recognized, however, that in some instances the use of a feedback driver amplifier or the use of peaking coils may be inappropriate or undesirable. The use of feedback with a driver amplifier may result in driver instability such as in a wideband system for processing very high frequency signals. Peaking coils in certain circumstances may pick up interference components associated with the magnetic fields developed by deflection circuits of a television receiver, for example. Such interference components can distort the black reference level of the video signal and are therefore particularly troublesome in a system wherein the video signal black level is monitored for purposes of automatic bias control, for example.

Accordingly, there is disclosed herein a kinescope driver arrangement which does not require feedback or peaking coils to produce an enhanced high frequency response. In the disclosed kinescope driver arrangement, a version of video signals processed by the driver stage is combined with video output signals from the driver stage in accordance with a given amplitude and phase relationship to produce a resultant high frequency signal representative of high frequency components deficient in the video output signal. The resultant signal is applied to an input of the driver stage to compensate for the high frequency deficiency otherwise exhibited by the video output signal.

In an implementation of the disclosed driver stage, the driver exhibits a high level signal output from which video signals are coupled to the kinescope, and a relatively low level video signal output of complementary phase relative to the high level output. The low level video signal is combined with the high level video signal in a given ratio, and a resulting high frequency combined signal is AC coupled to an input of the driver for enhancing the high frequency response of the video output driver.

In accordance with a feature of the invention, the driver stage corresponds to a digital-to-analog signal converter which receives input digital representations of analog video signals and provides high level output analog video signals with a magnitude for directly driving an intensity control electrode of the kinescope.

Figure 2B:
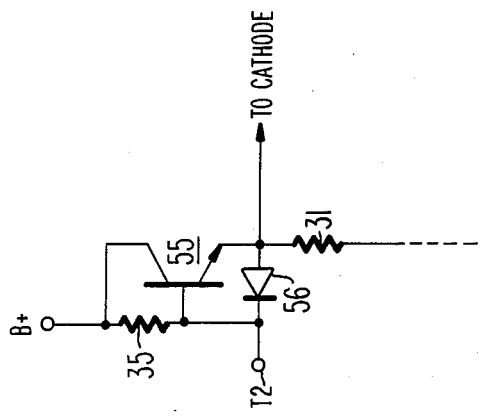
Figure 2A:
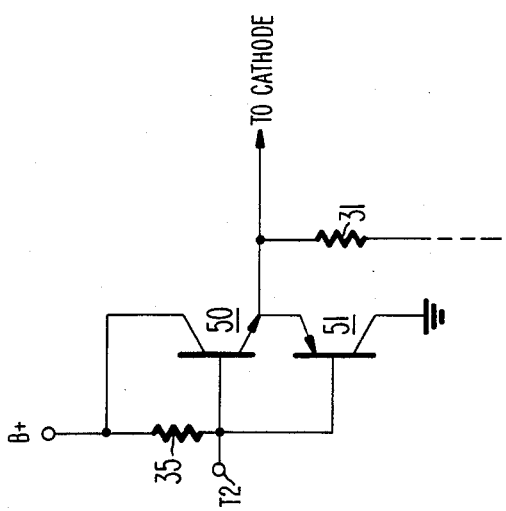

In the drawing:

FIG. 1 shows a portion of a color television receiver employing digital video signal processing techniques, and including a kinescope driver arrangement in accordance with the principles of the present invention; and FIGS. 2a and 2b show output circuits for use with the kinescope driver arrangement of FIG. 1.

In FIG. 1, analog color television video signals from a source 10 are converted to digital (binary) form by means of an analog-to-digital converter (ADC) 12. Digital signals from ADC 12 are processed by a digital video signal processor 14 including luminance and chrominance signal processing networks and a network for combining processed luminance and chrominance signals to produce plural output color image representative signals r, g and b. In this example the r, g and b signals are each represented by an 8-bit digital signal in binary form ($2^0 \ldots 2^7$). ADC network 12 and digital video signal processor 14 can be of the type employed in a digital television signal processing system such as that recently introduced by the Worldwide Semiconductor Group (Freiburg, West Germany) of International Telephone and Telegraph Corporation as described in an ITT Corporation publication titled "VLSI Digital TV System - DIGIT 2000." In that system color video signals, after being processed in digital (binary) form, are converted to analog form by means of digital-to-analog converters before being coupled to an image displaying kinescope. The analog color video signals are coupled to the kinescope via analog buffer amplifiers and video output kinescope driver amplifiers which provide video signals at a high level suitable for driving intensity control cathode electrodes of the kinescope.

However, in the present system, the r, g and b digital video signals from processor 14 are applied to binary inputs of digital-to-analog converter/driver stages 20R, 20G and 20B, respectively. High level R, G and B analog output signals from drivers 20R, 20B and 20G are respectively directly applied to cathode intensity control electrodes 24a, 24b and 24c of a color kinescope 25. Insofar as the converter/driver stages are similar in structure and operation, only the structure and operation of driver 20R will be described in detail.

The 8-bit ($2^0 \ldots 2^7$) r, digital signal is coupled to an input interface network 30 including buffers and level shifting circuits. Digital output signals from interface 30 are respectively coupled to control inputs of electronic current switches S0–S7, the inputs of which are respectively coupled to binary weighted constant current sources I0–I7. Each of switches S0–S7 has first and second signal outputs. The first analog outputs are connected in common and to a resistive voltage divider including resistors 31 and 32 via a terminal T1. The second outputs are separately connected to the source electrodes of respectively associated high voltage MOS output transistors Q0–Q7, which preferably are enhancement mode VMOS (Vertical MOS) FET devices such as the BS 107 device type available from ITT of Freiburg, West Germany or the BSS 93 device type available from Siemens of Munich, West Germany.

VMOS transistors Q0–Q7 are vertically (in contrast to laterally) structured semiconductor devices which can be readily constructed on a common integrated circuit substrate, either alone or together with switches S0–S7, current sources I0–I7, and interface network 30.

Information concerning the structure of VMOS devices is found in U.S. Pat. No. 4,364,073, for example. The physical structure of one form of VMOS device is also shown in my concurrently filed U.S. patent application Ser. No. 644,397 titled "Digital-To-Analog Converter." The latter application describes a VMOS digital-to-analog signal converter capable of directly driving a high voltage intensity control electrode of an image display device such as a kinescope in a television receiver. In particular, the latter application describes an advantageous converter/driver stage wherein a plurality of VMOS output devices have source areas dimensioned so as to preserve high frequency response and to reduce power consumption.

The vertical structure of the VMOS output devices facilitates the fabrication of these devices with a highly breakdown voltage rating, allowing the devices to directly drive the high voltage cathode electrode of the kinescope. The VMOS FET output devices also advantageously exhibit mutually uniform high voltage fast switching characteristics with substantially equal turn-on and turn-off delays, and which substantially avoid unwanted switching transients ("glitches"), particularly in comparison to the high voltage switching characteristics of bipolar transistors. The turn-on and turn-off times of the VMOS output drvices are substantially unaffected by the magnitude of the voltage being switched, whereby high voltage kinescope drive is possible. In addition, VMOS technology readily permits the manufacture and low cost integrated VMOS device arrays with common Gate and common Drain electrodes.

The Gate electrodes of output devices Q0–Q7 are connected in common to a source of reference potential +V, and the output Drain electrodes of devices Q0–Q7 are connected in common to an output load impedance 35 across which high level analog signal R is developed and appears at output terminal T2. Thus devices Q0–Q8 are connected in a common Gate configuration as unity gain current amplifiers with respect to currents conducted to the respective Source electrodes via switches S0–S7.

The currents from sources I0–I7 are routed by means of current switches S0–S7 either to terminal T1, or to output devices Q0–Q8, in accordance with the individual positions of switches S0–S7 as determined by the logic state of the binary output signals ($2^0 \ldots 2^7$) from interface 30. An analog kinescope cathode drive voltage appears at terminal T2 as a function of the value of load resistor 35 and the magnitude of the combined Drain currents of devices Q0–Q7 as flowing in load resistor 35. Suitable low pass filtering of the signal developed at terminal T2 is provided by means of load resistor 35 and the capacitance associated with the kinescope cathode.

An analog signal voltage component $\bar{S}$ developed across resistor 32 at terminal T1 corresponds to an opposite (complementary) phased version of the analog cathode drive signal voltage developed across resistor 35 since it is developed in response to the sum of currents I0–I7 which, by the action of switches S0–S7, are not coupled to the commonly connected drain electrodes of devices Q0–Q7. The complementary phased version ($\bar{S}$) of the drive signal voltage developed across resistor 35 is employed for enhancing the high frequency response of the driver stage as will be discussed subsequently.

The described high voltage converter/driver arrangement advantageously is capable of driving the cathode electrode of a kinescope directly without need of additional amplifying stages following the converter/driver stage, and is capable of being constructed as an integrated circuit. Circuits suitable for use as current switches S0–S7 and current sources I0–I7 are shown in my copending, concurrently filed U.S. patent application Ser. No. 644,398 titled "Kinescope Driver in a Digital Video Signal Processing System."

High frequency compensation of the video output signal developed at terminal T2 may be required for various reasons. For example, a large value of load resistor 35 may be chosen to conserve power, but such large value resistor can lead to degraded high frequency response of the output signal due to interaction with parasitic output capacitance. The output high frequency response may also be degraded due to the presence of a large value of parasitic output capacitance even with a relatively small value of output resistor 35, particularly when a very wide signal bandwidth is desired.

High frequency compensation of the driver stage is accomplished by means of a circuit including a VMOS transistor Q8 with a Drain output electrode coupled to output terminal T2, voltage divider resistors 31 and 32 coupled between output terminal T2 and ground reference potential, an AC coupling capacitor 38, and emitter coupled transistors 40 and 41 which have collector outputs respectively coupled to Gate and Source electrodes of transistor Q8. A signal conveyed by capacitor 38 from terminal T1 to the base input electrode of transistor 41 serves to control the relative conduction of transistors 40 and 41, and thereby controls the conduction of transistor Q8 and the magnitude of current conducted by output resistor 35. A transistor 43 acts as a current source for transistors 40 and 41 is provided by means of a source 45 of reference voltage VR, and bias coupling resistors 46 and 48.

A voltage divided version of the video output signal from output terminal T2 appears at terminal T1. The video signal developed at terminal T2, and thereby the video signal developed at terminal T1, can be expected to exhibit an attenuated high frequency response when the value of output resistor 35 is large to reduce power consumption, for example. Resistor 32 exhibits a relatively low value to develop a relatively wide bandwidth, low level, complementary phased video signal $\bar{S}$ at terminal T1 as derived from the complementary outputs of switches S0–S7. Thus "wideband" signal $\bar{S}$ at low impedance terminal T1 exhibits a relatively unattenuated high frequency characteristic compared to the "narrowband" video output signal developed at terminal T2.

The relative values of resistors 31 and 32 are chosen so that a predetermined portion of the video output signal from terminal T2 combines at terminal T1 with complementary phased wideband video signal $\bar{S}$. Specifically, the relative magnitudes of the complementary phased signals which are combined are such that lower frequency signal components are substantially cancelled at terminal T1, leaving a residual high frequency component representative of the difference in the high frequency content of the signals which are combined. The residual difference signal corresponds to a high frequency error correction signal which is coupled via capacitor 38 to the base input of transistor 41. Capacitor 38 serves to prevent unwanted DC level shifts such as may appear at output terminal T2 from affecting the high frequency compensation process. Such level shifts can occur, for example, as the output bias of the driver stage is varied manually or automatically to establish a desired black level bias for the associated kinescope cathode.

The high frequency correction signal is conducted via transistor 41 to transistor Q8, and appears in amplified form across output resistor 35. The high frequency correction signal developed across resistor 35 compensates for the otherwise attenuated high frequency characteristic of the video output signal, whereby the video output signal at termianl T2 exhibits the desired unattenuated high frequency characteristic.

FIGS. 2a and 2b show optional output buffer stages which can be used with the high frequency compensation network of FIGS. 1, and permit larger values of output load resistor 35 to be used without experiencing an excessive high frequency signal loss. In FIG. 2a an NPN transistor 50 and a PNP transistor 51 are connected as a complementary emitter follower stage with base inputs coupled to output terminal T2 of the driver stage and with emitter outputs coupled to the kinescope cathode. FIG. 2b illustrates an active load type output buffer including an NPN transistor 55 and a diode 56 arranged as shown. The complementary follower stage of FIG. 2a is preferred for having a more symmetrical response characteristic.

What is claimed is:

1. A video signal processing system comprising:
   a source of a video signal including high frequency components and relatively lower frequency components;
   image display means for producing an image display in response to a video signal applied to an intensity control electrode thereof;
   video output means including driver means responsive to said video signal from said source for producing a video output signal with a magnitude sufficient for directly driving said intensity control electrode of said display means, said video output signal being subject to exhibiting attenuated high frequency components;
   means for coupling said video output signal to said intensity control electrode;
   means for developing a first video signal related to said video output signal but having a relatively unattenuated high frequency characteristic compared to said video output signal;
   means for deriving a second video signal from said video output signal;
   means for combining said second video signal with said first video signal in a given mutual amplitude and phase relationship for producing a resultant high frequency signal representative of high frequency components attenuated in said video output signal; and
   means for coupling said resultant signal to said video output means.

2. A system according to claim 1, wherein
   said first and second video signals combined by said combining means exhibit a mutually complementary phase relationship.

3. A system according to claim 1, wherein
   said means for coupling said resultant signal to said video output means comprises AC coupling means;
   said second video signal is an attenuated version of said video output; and
   said first and second video signals combined by said combining means exhibit a mutually complementary phase relationship.

4. A system according to claim 1, wherein
   said driver means includes first and second mutually complementary phased video signal outputs; and
   said first and second video signals combined by said combining means are respectively derived from said first and second outputs.

5. A system according to claim 4, wherein
   said video output signal is provided at said second output;
   said first video signal is derived from said first output;
   said second video signal is derived from said second output; and
   a load impedance is coupled to said second output, said load impedance exhibiting a value greater than the value of an impedance presented at said first output.

6. A system according to claim 5, wherein a resistive voltage divider is coupled from said second output to a point of reference potential;
   said first output is coupled to a point on said voltage divider at which said second video signal from said second output is developed and at which said impedance presented at said first output is developed; and
   said resultant signal is developed at said voltage divider point and is coupled therefrom to said video output means.

7. A system according to claim 4, wherein
   said first output corresponds to a low level, wideband output relative to said second output.

8. A digital video signal processing system comprising:
   a source of a digital video signal including high frequency components and relatively lower frequency components;
   image display means responsive to a video signal applied to an intensity control electrode thereof;
   digital-to-analog signal converting driver means with an input responsive to said digital video signal, and an output for providing to said intensity control electrode an analog video output signal with a magnitude suitable for directly driving said intensity control electrode , said analog video output signal being subject to exhibiting attenuated high frequency components;
   means for developing a first video signal related to said analog video output signal but having a relatively unattenuated high frequency characteristic compared to said analog video output signal;
   means for deriving a second video signal from said analog video output signal;
   means for combining said second video signal with said first video signal in a given mutual amplitude and phase relationship for producing a resultant high frequency signal representative of high frequency components attenuated in said video output signal; and
   means for coupling said resultant signal to said driver means.

9. A system according to claim 8, wherein
   said first and second video signals combined by said combining means exhibit a mutually complementary phase relationship.

10. A system according to claim 8, wherein
said driver means includes first and second complementary phased video signal outputs; and
said first and second video signals combined by said combining means are respectively derived from said first and second outputs.

11. A system according to claim 10, wherein
said digital video signal from said source contains plural image information bits with first and second logic states;
said driver means includes signal inputs for respectively receiving said information bits of said digital video signal;
plural input switching means, included in said driver means, are respectively responsive to individual ones of said information bits and have an input and first and second mutually complementary outputs;
plural current sources, included in said driver means, are respectively coupled to said inputs of said switching means; and
plural output devices, included in said driver means, each having an output coupled in common to said intensity control electrode of said display means, and an input respectively coupled to outputs of said switching means; wherein
each of said first and second outputs is selectively coupled to said current sources in accordance with said first and second logic states of said input digital information bits;
said first outputs of said switching means are connected in common and to a combining point, said first outputs of said switching means providing said first video signal; and
said second outputs of said switching means are respectively coupled to said inputs of said output devices.

12. A system according to claim 11, wherein
said commonly connected first outputs of said switching means correspond to a low level, wideband output relative to said commonly coupled outputs of said output devices.

13. A system according to claim 12, wherein
a load impedance is coupled to said output devices, said load impedance exhibiting a value greater than the value of an impedance presented to said commonly connected first outputs of said switching means.

14. A system according to claim 13, wherein
said second video signal is an attenuated version of said video output signal; and
said combining means combines said second signal with said first video signal provided from said commonly connected first outputs of said switching means.

* * * * *

UNITED STATES PATENT AND TRADEMARK OFFICE
CERTIFICATE OF CORRECTION

PATENT NO. : 4,599,655

DATED : July 8, 1986

INVENTOR(S) : Werner Hinn

It is certified that error appears in the above-identified patent and that said Letters Patent is hereby corrected as shown below:

On the title sheet, Appl. No.: 544,453 should be --644,453--.

Column 3, line 19, delete "highly" and insert --high--.
Column 3, line 29, delete "drvices" and insert --devices--.
Column 4, line 39, after "41" insert --. Bias for the base electrodes of transistors 40 and 41--.
Column 6, line 2, after "output" insert --signal--.

Signed and Sealed this

Thirtieth Day of September 1986

[SEAL]

Attest:

DONALD J. QUIGG

Attesting Officer

Commissioner of Patents and Trademarks